April 26, 1938.　　　　J. E. GOSLINE　　　　2,115,018
PRESSURE RECORDER
Filed Aug. 14, 1936　　　　2 Sheets-Sheet 1

Inventor:
JAMES E. GOSLINE
by
Attorney.

Inventor
JAMES E. GOSLINE
by *Attorney*

Patented Apr. 26, 1938

2,115,018

UNITED STATES PATENT OFFICE 2,115,018

PRESSURE RECORDER

James E. Gosline, Berkeley, Calif., assignor to Standard Oil Company of California, San Francisco, Calif., a corporation of Delaware Application August 14, 1936, Serial No. 96,016

10 Claims. (Cl. 73—300)

This invention relates to pressure recorders such as are used for determining the relation between pressure and depth in oil wells, and particularly refers to one in which a liquid is used as the transmission means for actuating the recording mechanism and an elastic fluid such as a gas is employed in place of a mechanical spring or the like to resist the force exerted by the well fluid pressure on the recording means.

Heretofore pressure recorders or gauges of the type used in deep wells, such as oil wells, have utilized mechanical movements with pistons, packing glands, Bourdon tubes, bellows, coil springs, geared multipliers and the like to respond to pressure variations in the well fluid and to actuate the actual recording means. These have all had the disadvantages of undeterminable and varying friction losses, lost motion and relatively limited range of recorder motion, so that the charts obtained were either inaccurate, or required frequent and expensive calibration, or required a microscopic examination to decipher the record thereon.

This invention is characterized by the use of a liquid transmission element in a rigid container, and adapted to be displaced against an elastic fluid, such as a gas, by variations in the pressure surrounding the device. A further feature which may be employed is the use of a predetermined initial or starting pressure selectively maintained upon the elastic fluid, so that the responsive range of the device may be preselected, and a maximum deflection of the recording means may be obtained, as will be discussed more fully below. The actual recording chart mechanism and the clockwork or other means which may be employed for its rotation form no part of this invention and may be of any conventional type.

It is an object of this invention to provide a depth pressure recorder or gauge which may be made small in diameter and therefore adapted to be run in small diameter tubing, drill pipe and the like.

Another object is to provide a depth pressure recorder in which a substantially frictionless liquid medium is used to transmit pressure from the well fluid to the motion restraining means, and in which the variation in the level of the liquid may be utilized to form a continuous, as differentiated from a maximum record of the pressure of said well fluid.

Another object is to provide a depth pressure recorder in which the motion restraining means comprises a frictionless elastic fluid such as a gas, which will avoid hysteresis or friction effects and which will have a substantially constant temperature correction factor.

Another object is to provide a depth pressure recorder that may be precharged or preset so that well fluid pressures lower than the predetermined value will have no effect upon the device or the record therefrom, thereby extending the useful chart range and giving a higher degree of practical accuracy in that pressure range which it is desired to explore.

Another object is to provide a continuously recording gauge construction with a minimum of moving parts and of simple and economical construction.

These and other objects and advantages will be more fully apparent from the following description and from the accompanying drawings which form a part of this specification and illustrates a preferred embodiment of this invention.

In the drawings, Figure 1 is a vertical or longitudinal sectional view of the upper or recording portion of a pressure recorder of the type to be described.

Figure 1:
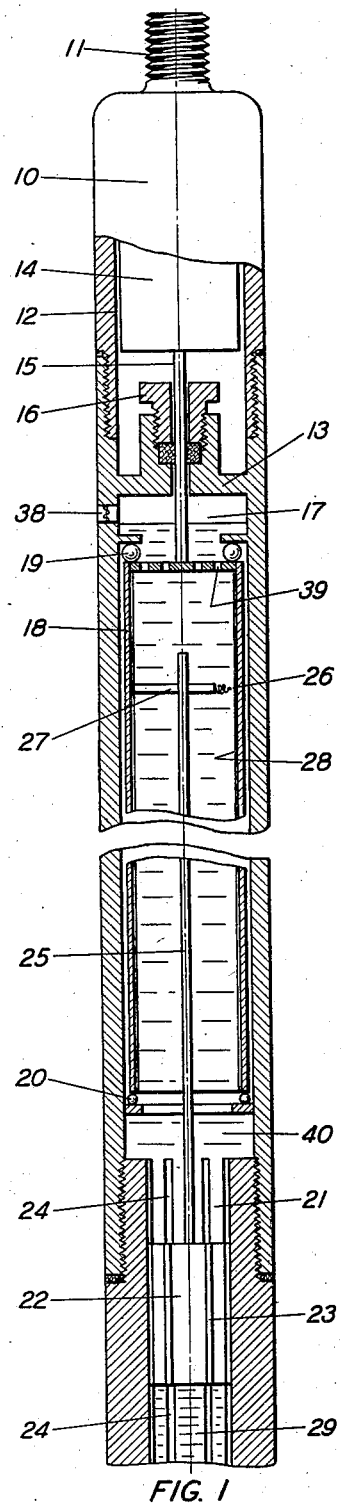

Referring to the drawings and particularly to Figure 1, the reference number 10 indicates generally a cylindrical casing which is divided by partitions and coupled together in sections by threaded joints, preferably gasketed for tightness, to form a number of chambers for the various parts of the mechanism and means to be described below. A threaded stud 11, to which may be secured a conventional rope or wire line socket is preferably formed at the upper end of casing 10.

The upper chamber 12 is formed by partition 13, and, in this example, contains a conventional small diameter clockwork generally designated 14 and which is provided with a small diameter motion output shaft 15. Shaft 15 passes through a stuffing box or similar sealing means 16 in partition 13, and extends into the second or chart chamber 17, where it is connected to a cylindrical chart holder generally designated 18. Chart holder 18 is preferably removably positioned and is journalled at both ends as by a thrust bearing 19 and a radial bearing 20.

Immediately below chart chamber 17, and, in this example, in open communication therewith, is a float chamber 21 in which a light metal float 22 is adapted to move, and to be guided in its motion by splines 23 which engage corresponding grooves 24 in the inner wall of the float chamber. A stylus rod 25, preferably of a light strong material such as a magnesium or aluminum alloy, extends upwardly from float 22 and carries a sharp hard metal or diamond pointed stylus or marking means 26, which is preferably resiliently opposed by a smooth ended strut 27, to center and align rod 25 and stylus 26 and to give adequate force so that the sharp pointed stylus will leave a trace or scratch on a chart 28. Chart 28 is preferably formed with a soft sheet metal or foil facing such as aluminum rolled or preformed so as to closely fit the cylindrical bore of chart holder 18 and suitably removably secured therein.

Float chamber 21 is adapted to contain a quantity of a heavy liquid 29, such as mercury, and the float 22 is adapted to record on chart 28 any variation in the level of the liquid 29, as will be more fully described below.

Figure 2:
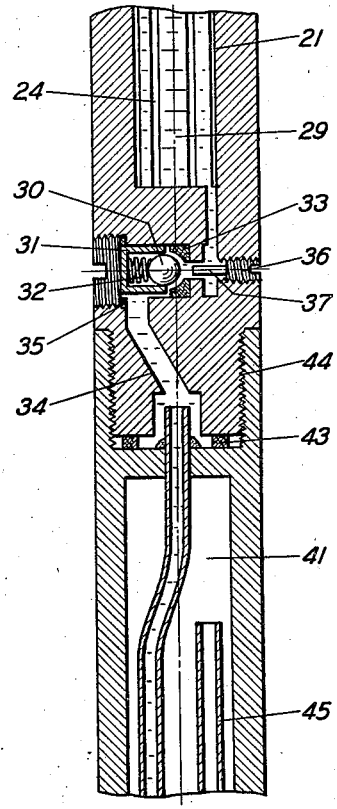
Figure 2 is a similar vertical or longitudinal sectional view of the lower or fluid chamber of the recorder of Figure 1.

Referring now to Figure 2, which is a downward continuation of the device partially illustrated in Figure 1, it will be noted that float chamber 21 extends downwardly in casing 10 and is closed at its lower end by a check valve or similar structure, so arranged that it will permit fluid flow downwardly out of float chamber, but will prevent flow in the opposite direction, for a reason which will be apparent below. In this example, the check valve or flow restraining means comprises a steel ball 30 held within a cage 31 screwed into the wall of casing 10, and urged by spring 32 against a renewable resilient seat 33, which may be of "Duprene" or similar durable elastic material and which is mounted in a passage 34 from float chamber 21. A suitable gasket 35 is provided to prevent fluid leakage in either direction around the threads of cage 31. In order to open the check valve just described, a threaded screw 36 is mounted in the casing 10 and has a stem or extension 37 projecting into passage 34 and adapted to move ball 30 from seat 33 when screw 36 is advanced into the casing.

For admitting well fluid pressure into float chamber 21 a small screened port 38 is provided in casing 10, preferably at the extreme upper end of chart chamber 17, and suitable provision is made, as by ports 39 in chart holder 18, so that the well fluid pressure may have ready access to both chambers. In operation, the space above the mercury in float chamber 21 and all of chart chamber 17 is filled with a suitable liquid such as fairly viscous lubricating oil 40 which serves to lubricate bearings 19 and 20 and also limits the quantity of well fluid which may enter chamber 17.

Below the float chamber 21 and communicating therewith by means of passage 34 described above, is a gas pressure chamber 41, which is fitted with a liquid trap such as tube 42. Inasmuch as this chamber is required to hold gases, such as hydrogen, helium or nitrogen, under very high pressures, it is suitably treated internally as by electroplating with a dense metal such as chromium, or by burnishing, or by other known means, to reduce absorption of the gas into the chamber walls. The lower part of gas chamber 41 also forms a receptacle into which the mercury from float chamber 21 is forced by the well fluid pressure against the gas pressure which is maintained in chamber 41 by check valve 30. A suitable gasket 43 is preferably provided to hold this gas pressure at the threaded joint 44.

The lower end of chamber 41 is fitted with some form of gas charging connection, comprising, in this example, a short tube 45 and a valve 46, such as a needle valve. These also should be of suitable dense material or suitably coated to resist gas absorption, as explained above for chamber 41. A protecting cap or closure 47 may be threaded to the lower end of the casing 10 to protect valve 46 when the device is lowered into a well bore.

Figure 3:
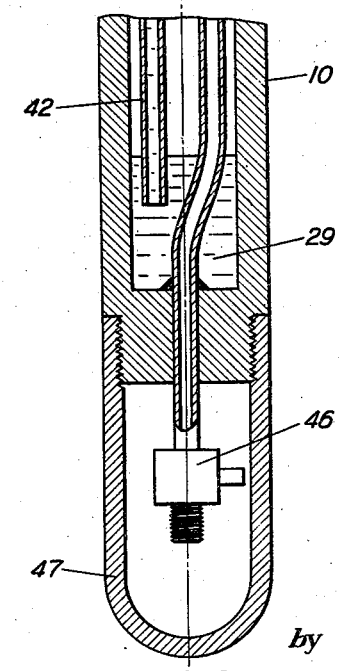
Figure 3 is a diagrammatic view of the gauge of Figures 1 and 2 illustrating one mode of precharging it with a gas to a desired pressure.
Figure 3:
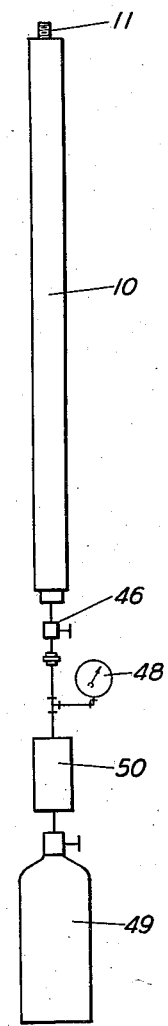

To place the device in operation, the float chamber 21 is filled with mercury to the level desired, leaving check valve 30 open by screwing in screw 36, to seal off the bottom of tube 42. This will bring float 22 to the position shown so that stylus 26 will be lifted to the upper portion of chart 28. The clockwork 14 is wound and started and the recording section (Figure 1) is reassembled, after which it is filled with lubricating and sealing oil, as explained above. The gas pressure charging valve 46 is connected, as shown in Figure 3, to a pressure gauge 48 and to a suitable supply of high pressure gas, such as a portable storage tank 49. A drying tube 50 containing calcium chloride, or other suitable drying agent, is preferably placed in the gas line to remove any moisture that may be present. Chamber 41 is then charged with gas to a desired pressure, for example 2000 pounds per square inch, as a minimum above which the well pressure record is desired. It will be obvious that no lower well fluid pressure will lift the check valve 30 from its seat and permit mercury to be displaced through passage 34 and tube 42 into chamber 41, so that the record on chart 28 will begin, in this case, at about 2000 pounds per square inch and will continue upwardly at a rate depending upon the well known gas laws and the respective areas of cross-section of gas chamber 41 and float chamber 21. Calibration may easily be effected by suitable fluid pressures imposed upon the float chamber 21 according to usual procedures of this nature.

This "pre-charging" mode of operation for a device of this nature is particularly valuable, as it gives an extended, full, and complete record in the most desired range, for example from 2000 to 3000 pounds per square inch, and there will be no record of the 0 to 2000 pounds per square inch traverse, which is ordinarily of no value to the investigators. After the well depth has been reached at which the total well fluid pressure will overcome the precharged gas pressure and force open the check valve 30, the increments of pressure above that value will displace mercury 29 downwardly through passage 34 into the lower portion of gas chamber 41. The float 22 will follow this descending level and will cause stylus 26 to leave its corresponding mark on chart 28, which latter is being slowly rotated by clockwork 14. Thus a continuous record of pressure and time will be obtained, which can be correlated with the usual depth-time relation, determined by the rate and time of lowering the device, to give the desired depth-pressure measurement. The effect of temperature on the record may be determined from the usual temperature pressure calibration made with instruments of this nature.

After the pressure recorder has been run in a well and removed therefrom, the mercury 29 which has been displaced in chamber 41 may be returned to float chamber 21 by opening check valve 30 through the medium of the screw 36. This allows the gas pressure in chamber 41 to force the mercury upwardly through tube 42, and after the lower end of the tube has been exposed the gas in chamber 41 may also be released, cautiously, by the same path. If care is not taken, the liquids in chamber 21 may be too violently expelled. To avoid this, and to permit release of the gas through valve 46 after the mercury level has been restored in chamber 21, the gas charging tube 45 may be extended upwardly into the upper part of chamber 41 to terminate above the mercury level therein, as shown in Figure 2.

It is obvious that the level of the liquid accumulated in gas pressure chamber 41 could alternatively be used as a basis for pressure measurement, as it accurately represents the liquid displaced from float chamber 21 by the added external fluid pressure over the gas pressure in chamber 41. Thus a recording means for the liquid level in chamber 41 could equally well be used as that shown in chamber 21, if such a construction were desired.

Figures 4, 5:
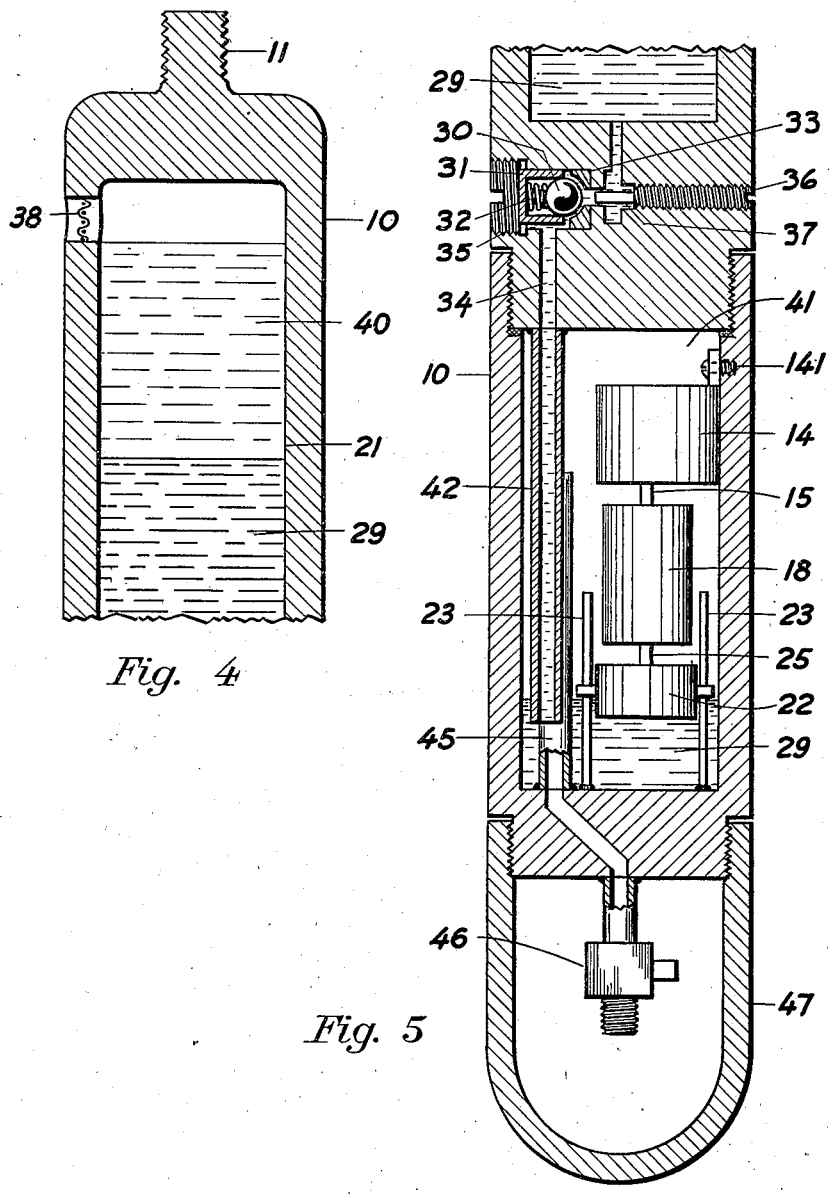
Figure 4 is a vertical or longitudinal sectional view of the upper portion of a pressure recorder embodying this invention in which the recording mechanism is located in the lower or gas pressure chamber.
Figure 5 is a similar vertical or longitudinal sectional view of the lower gas chamber and level recording chamber of the recorder of Figure 4.

Such an arrangement is illustrated by Figures 4 and 5, and differs from that already described only in the following particulars. The mechanism or means for recording the liquid level in chamber 41 may comprise clockwork 14, secured in case 10 as by screw 141, the clockwork acting to drive chart holder 18 through shaft 15. Float 22 is guided by spline or guide members 23 to move vertically in chamber 41 with a change in level of liquid 29 therein and actuates stylus rod 25, as previously described for the embodiment of Figures 1 and 2.

Inasmuch as the recording means is in the lower part of the instrument case 10 in this embodiment, the upper chamber 21 may be arranged as illustrated in Figure 4, and contains the heavy liquid 29, in this case mercury, and a sealing liquid 40 such as oil, on which latter the well fluid pressure is admitted through screened port or opening 38.

Although two specific constructions embodying this invention have been described and illustrated, it is to be understood that the invention is not limited to those specific devices and their herein described modes of operation, and all such modifications and changes as come within the scope of the appended claims are embraced thereby.

I claim:

1. A pressure recorder comprising means forming a first chamber communicating with the fluid medium whose pressure is to be measured, a liquid in said first chamber, said liquid being of greater density than said fluid medium, means forming a second chamber adapted to contain a gas at a predetermined pressure, a passage connecting said chambers, said passage communicating with said first chamber at a point below the level of the liquid therein, flow restricting means in said passage so constructed and arranged that said liquid can flow from said first to said second chambers only at such time that the pressure in said first chamber exceeds that in said second chamber, and means for recording the level of the liquid in one of said chambers.

2. A pressure recorder according to claim 1 in which said recording means comprises a float for said liquid, marking means carried by said float, a movable chart cooperating with said marking means to produce a record of said liquid level, and means for moving said chart.

3. A pressure recorder according to claim 1 in which said flow restricting means comprises a check valve element adapted to be seated on a valve seat, and means for selectively moving said element from said seat.

4. A pressure recorder according to claim 1, in which said passage connecting said chambers terminates adjacent the lower portion of said second chamber to form a liquid seal therein.

5. A pressure recorder according to claim 1, with the addition of means for introducing a gas into said second chamber, said means comprising a passage and a valve for said passage.

6. A pressure recorder according to claim 1, with the addition of means for introducing a gas into said second chamber, said means comprising a conduit terminating near the upper portion of said chamber and a valve for said conduit.

7. A pressure recorder comprising means forming a first chamber communicating with the medium whose pressure is to be measured, a liquid in said first chamber, means forming a second chamber adapted to contain a gas at a predetermined pressure, a passage connecting said chambers, flow restricting means in said passage so constructed and arranged that said liquid will flow from said first to said second chamber only at such time that the pressure in said first chamber exceeds that in said second chamber, and means for measuring the liquid displaced from said first chamber by a pressure differential between said chambers.

8. A pressure recorder according to claim 7 in which said last named means measures the level of liquid displaced into said second chamber by a pressure differential between said chambers.

9. A pressure recorder comprising means forming a first chamber, a liquid in said first chamber in pressure communication with the medium whose pressure is to be measured, means forming a second chamber adapted to contain a gas at a predetermined pressure, a passage connecting said chambers, flow restricting means in said passage so constructed and arranged that said liquid will flow from said first to said second chamber only at such time that the pressure in said first chamber exceeds that in said second chamber, and means for measuring the liquid displaced from said first chamber by a pressure differential between said chambers.

10. A pressure recorder comprising means forming a first chamber, a fluid in said first chamber in pressure communication with the medium whose pressure is to be measured, means forming a second chamber adapted to contain a gas at a predetermined pressure, a passage connecting said chambers, flow restricting means in said passage so constructed and arranged that said fluid will flow from said first to said second chamber only at such time that the pressure in said first chamber exceeds that in said second chamber, and means for measuring the fluid expelled from said first chamber by a pressure differential between said chambers.

JAMES E. GOSLINE.